United States Patent
Prince et al.

(10) Patent No.: US 6,803,581 B2
(45) Date of Patent: Oct. 12, 2004

(54) SEMICONDUCTOR PHOTODIODE WITH INTEGRATED MICROPOROUS FILTER

(75) Inventors: Chad J. Prince, Torrance, CA (US); Raj Korde, San Pedro, CA (US)

(73) Assignee: International Radiation Detectors, Inc., Torrance, CA (US)

(*) Notice: Subject to any disclaimer, the term of this patent is extended or adjusted under 35 U.S.C. 154(b) by 254 days.

(21) Appl. No.: 10/207,284

(22) Filed: Jul. 30, 2002

(65) Prior Publication Data

US 2004/0021085 A1 Feb. 5, 2004

(51) Int. Cl.⁷ .................................................. G01J 5/10
(52) U.S. Cl. ..................................................... 250/372
(58) Field of Search .................................. 250/372, 226

(56) References Cited

U.S. PATENT DOCUMENTS 5,686,727 A * 11/1997 Reenstra et al. ............ 250/372

* cited by examiner

*Primary Examiner*—Constantine Hannaher
*Assistant Examiner*—Timothy Moran (57) ABSTRACT

A photodiode with integrated microporous filter formed on a semiconductor substrate is provided. The microporous filter will provide in excess of six orders of magnitude visible light reduction while transmitting a measurable amount of UV/EUV radiation. A process for manufacturing the photodiode with integrated microporous filter is also presented.

11 Claims, 7 Drawing Sheets

SEMICONDUCTOR PHOTODIODE WITH INTEGRATED MICROPOROUS FILTER

FEDERALLY SPONSORED RESEARCH

Not Applicable

SEQUENCE LISTING OR PROGRAM

Not Applicable

BACKGROUND

1. Field of Invention

This invention relates, in general, to optically filtered photodiodes, and more specifically to a photodiode with an integrated microporous optical filter.

BACKGROUND

2. Description of Prior Art

A photodiode is broadly defined as a device that responds to incident electromagnetic radiation by converting the radiation into electrical energy, thereby enabling measurement of the intensity of the incident radiation. In many applications the incident radiation will not be monochromatic but consist of a spectrum of wavelengths. Often, it is desirable to detect a certain range of wavelengths. In such an application, radiation with wavelengths outside the desired range of wavelengths constitutes noise to the measurement system. Photodiodes with integrated filters were developed to reduce the amount of this noise when measuring a desired wavelength range.

According to Spaeth (U.S. Pat. No. 4,158,133), photodiodes with integrated filters use interference filters for ultraviolet radiation (160 nm to 400 nm photon wavelength). J. F. Seely et. al (Characterization of Silicon Photodiode Detectors with Multilayer Filter Coatings for 17–150 Å; SPIE Vol. 3764. 1999) has demonstrated that thin metallic films such as aluminum or molybdenum can be used as bandpass filters for extreme ultraviolet radiation (1 nm to 160 nm photon wavelength). These filters absorb or reflect a large fraction of unwanted radiation and transmit a fraction of the radiation of interest. Unfortunately, these types of filters can only provide up to five orders of magnitude blocking of the unwanted radiation while transmitting a measurable amount of ultraviolet (UV) or extreme ultraviolet (EUV) radiation. In other words, the amount of noise can only be reduced in magnitude by a factor of no more than about 100,000 using these filters.

Many UV/EUV radiation sources (mainly the sun) produce noise, namely visible light, with magnitude greater than a million times that of the UV/EUV radiation.

According to Gruntman (Submicron structures—promising filters in EUV. A review. SPIE Vol. 1549 EUV, X-Ray, and Gamma-Ray Instrumentation for Astronomy II, p. 385–394, 1991), microporous filtering has been implemented in the micron wavelength region. The reflection of infrared radiation by porous structures with pore diameters in the micron range is utilized in "superinsulator" shields for thermal protection in high vacuum low-temperature applications. On the other hand, films perforated by channels with much smaller diameter, in the range 10–100 nm, are required for filtering UV/EUV radiation.

Gruntman derives the spectral transmission $T_f$ of a microporous filter as a function of wavelength $\lambda$ as follows:

The qualitative dependence of pore transmission can be divided into two regions, transmission for small wavelengths ($\lambda < D_0$) and transmission for large wavelengths ($\lambda > D_0$). For short wavelengths, the transmission of one hole $T_p$ is asymptotically approaching a value of one as $\lambda$ becomes smaller and the total filter transmission approaches G. The quantity G is the geometrical transparency of the filter. For large wavelengths, the transmission drops very steeply with the increase of $\lambda$ and the transmission is given by the dependence $T_f(\lambda) = T_p(\lambda) G$ where $T_p = D_0^{12}/(\lambda^{10} L^2)$ and $G = N_p(\pi D_0^2/4)$ and $D_0$ is the hole diameter, $\lambda$ is the wavelength, $N_p$ is the number of pores per filter unit area and L is the microporous filter thickness. For low flux levels, G should be as large as possible and for high flux levels, G should be accordingly low. By varying $D_0$, $N_p$ and L, it is possible to tune the filter to pass a given band of wavelengths.

A microporous filter can be formed by using techniques of lithography. X-ray lithography has been used to create regular porous membranes in thin films made from polymers such as mylar as reported by G. N. Kulipanov et. al. (Application of deep X-ray lithography for fabrication of polymer regular membranes with submicron pores, SPIE, Vol. 2723, p. 268–275, 1996). An X-ray mask was fabricated on the base of a boron doped silicon wafer. A titanium and nickel film were evaporated onto the wafer as a background for gold electroplating. To create the holes in the gold absorbing layer, the regular $SiO_2$ columns of 1 micron high and 0.35 to 0.5 micron diameter were originally formed using electron beam lithography. Then, the electroplating of a 1 micron thick gold film was carried out and the $SiO_2$ removed by dry etching. The silicon wafer was then etched from its back side to its etch stops and a silicon membrane of 2 micron thick forms. The mylar film and X-ray mask are then mounted into a vacuum chamber of an X-ray lithography station and exposed to X-rays produced by synchrotron radiation. This process realized 200 nm holes with a very small value of pore diameter spread.

Anodic oxidation of aluminum is yet another method that can be used to form a microporous filter. As reported by R. C. Rumeaux et al. (The formation of controlled-porosity membranes from anodically oxidized aluminum; Nature, Vol. 337, Jan. 12, 1989), the anodic oxidation of aluminum can produce porous films with a remarkably uniform array of cells, each containing a cylindrical pore. The anodizing voltage controls the pore size and pore density, whereas the thickness is determined by the anodization time. Pore sizes of 10 nm to 250 nm, pore densities of $10^8$ g $cm^{-2}$ to $10^{11}$ $cm^{-2}$ and film thicknesses of over 100 $\mu$m can be achieved.

OBJECTS AND ADVANTAGES

Accordingly, it is an object of the present invention to provide a semiconductor photodiode with an integrated filter that can provide up to eight orders of magnitude visible light reduction while transmitting a measurable amount of UV/EUV radiation.

A further object of the present invention is to provide a photodiode with integrated microporous filter for UV/EUV radiation detection.

Another object of the present invention is to provide a means of manufacturing a photodiode with an integrated microporous filter which reduces the amount of unwanted radiation (optical noise) by a factor of more than a million.

SUMMARY OF THE INVENTION

These and other objects and advantages are provided by a semiconductor photodiode having an integrated microporous optical filter formed over its active surface area. The microporous optical filter is a thin perforated metallic film which serves to transmit radiation with wavelengths shorter than the filter hole diameter and reflect or absorb radiation with wavelengths longer than the filter hole diameter. This type of filter will reduce the transmission of visible light in excess of a million times while still transmitting a measurable percentage of UV/EUV radiation. The microporous filter will be tunable to pass a specified band of UV/EUV wavelengths by selecting the hole diameter, hole pattern, and thickness of the filter. The technology to manufacture 200 nm diameter holes is available at this time and the technology to realize 40 nm diameter holes will be available for production within the next few years.

According to one embodiment, the present invention comprises a single photodiode with integrated microporous filter having predetermined optical properties.

In another embodiment, the present invention comprises a matrix of photodiodes, commonly known as a photodiode array, that are formed in one semiconductor chip with integrated microporous filters.

In another embodiment, the present invention comprises a method of making a photodiode with integrated microporous filter with predetermined optical properties. The method comprises fabrication of a photodiode with an integrated metallic microporous filter by using techniques of photolithography and etching used in the semiconductor industry.

In another embodiment, the present invention comprises a method of making a photodiode with an integrated microporous filter with predetermined optical properties. The method comprises fabrication of a photodiode with an integrated porous alumina filter by using techniques of photolithography in conjunction with anodic oxidation.

BRIEF DESCRIPTION OF THE DRAWINGS

FIG. 2b is a second embodiment of a microporous filter structure as depicted in FIG. 2a.

DETAILED DESCRIPTION OF THE PREFERED EMBODIMENTS

Figure 1:
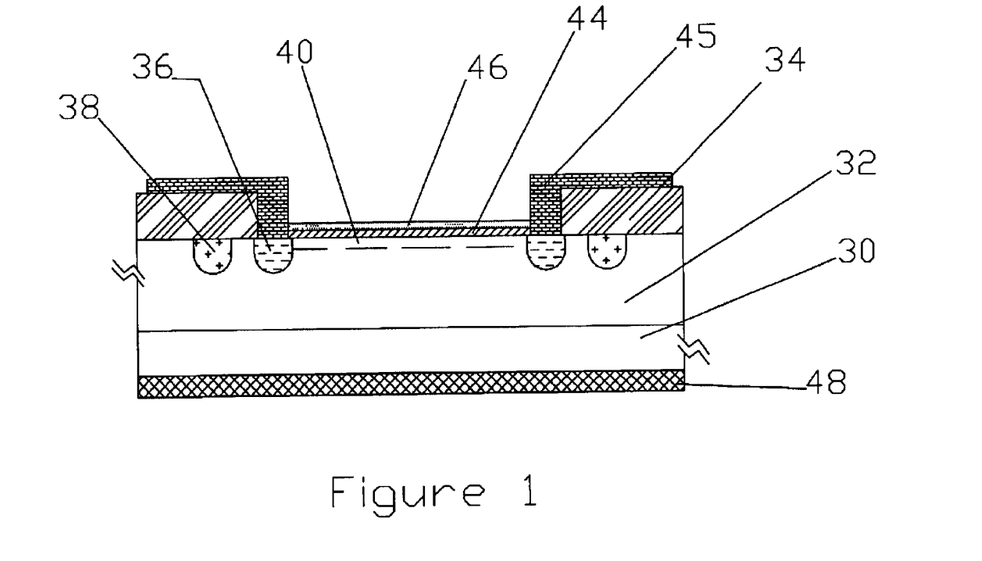
FIG. 1 illustrates the cross section of one embodiment of the single photodiode with integrated microporous filter.

FIG. 1 illustrates the cross section of a photodiode with integrated microporous filter. The photodiode can be fabricated by an ULSI (Ultra Large Scale Integrated Circuit) compatible process. A substrate 30 comprises a semiconductor material that is doped p-type. It should be understood that either n- or p-type conductivity can be used so long as junctions are formed as described herein below. A 6 micron to 100 micron p-type epitaxial layer 32 is located on the substrate. An n-type epitaxial layer will be located on an n-type substrate if the latter is used. A field oxide layer 34 is located on the epitaxial layer. An n+ region 36 and a p+ region 38 are located on the epitaxial layer for an electrical contact and channel stop respectively. A phosphorus or arsenic doped, defect free n-type region 40 is located on the epitaxial layer. A passivating oxide layer 44 is located on the epitaxial layer. An aluminum layer 45 is located on the surface of the photodiode which is used for electrical contact to which wire bonds will be attached. A metallic microporous filter 46 is formed over the passivating oxide. A chromium-gold layer 48 is deposited on the back of the photodiode for electrical contact. The passivating oxide will be approximately 7 nm thick for EUV detectors and 70 nm thick for UV detectors.

Figure 2A:
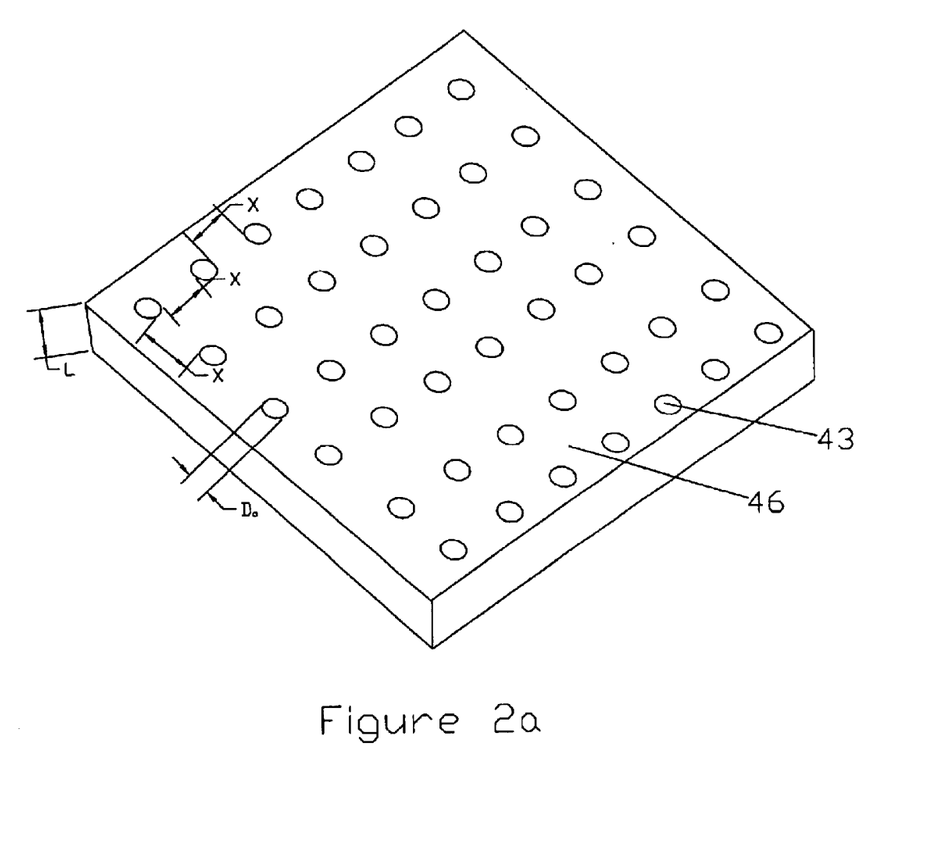
FIG. 2a illustrates a highly enlarged subsection of the topology of one embodiment of a microporous filter.

FIG. 2a illustrates a highly magnified view of microporous filter 46 showing micropore 43 in an array of similar micropores (holes). In this embodiment, the microporous filter consists of uniformly spaced micropores and is fabricated by lithography and etching.

Figure 2B:
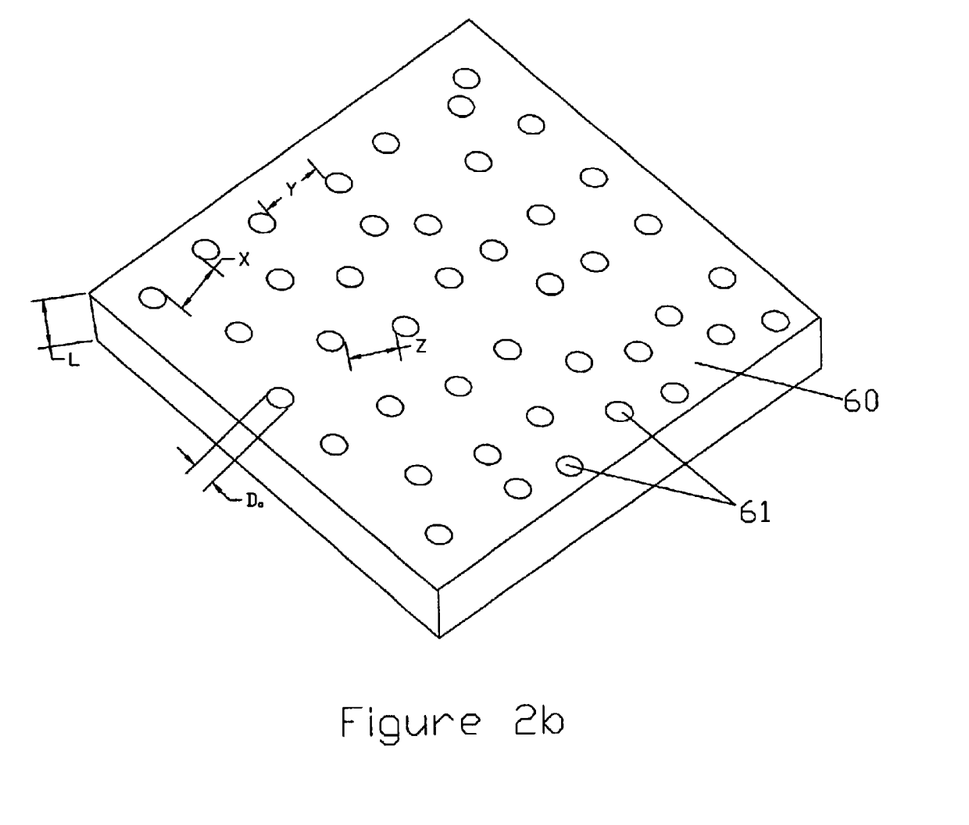

FIG. 2b illustrates a second embodiment of a microporous filter 60 showing randomly spaced micropores 61. In this embodiment, the microporous filter consists of randomly spaced micropores and is fabricated by anodic oxidation.

Figure 3:
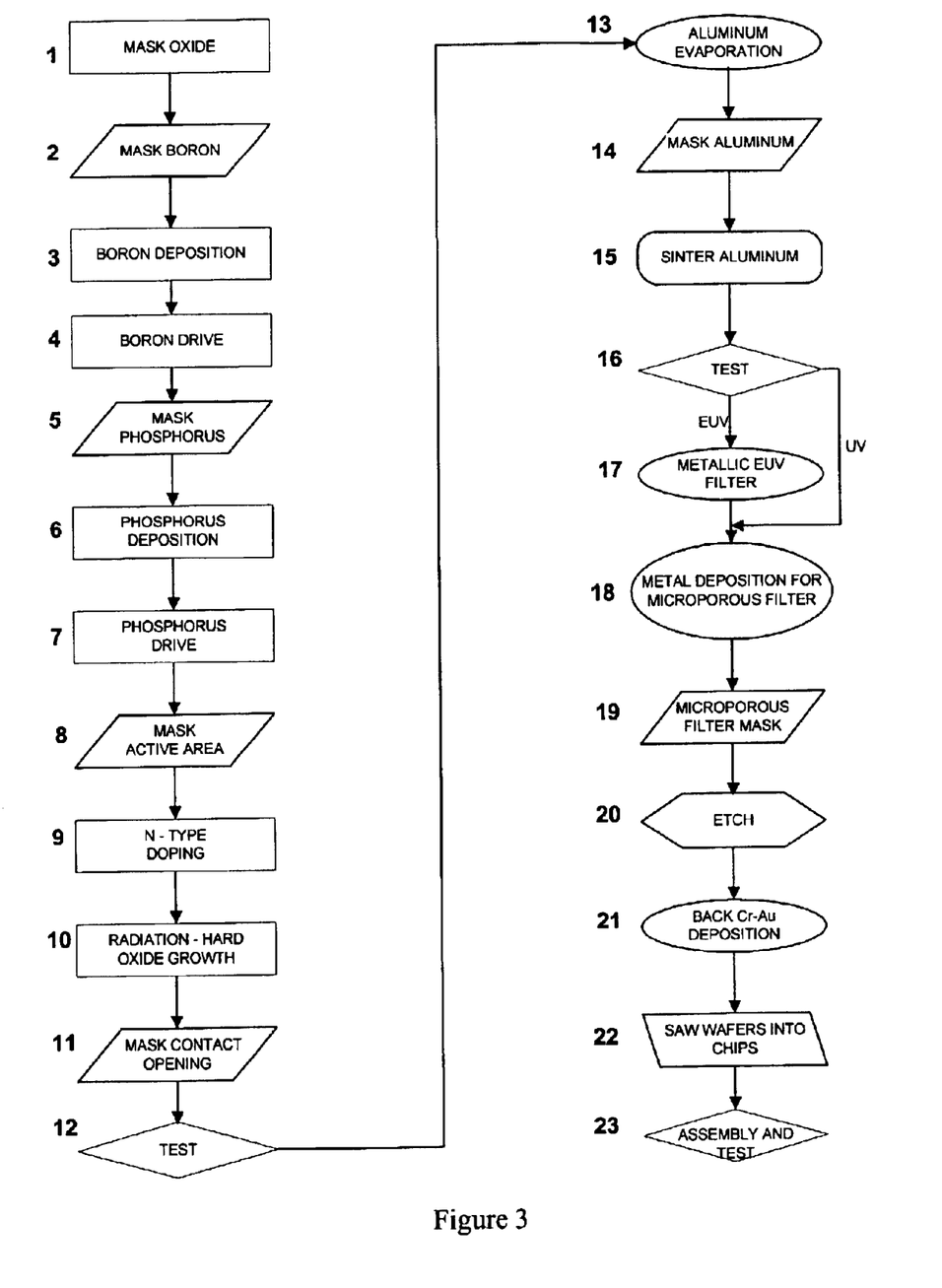
FIG. 3 illustrates the process by which one embodiment of the photodiode with an integrated microporous filter may be produced.

FIG. 3 illustrates one process of manufacturing the photodiode with integrated microporous filter as follows:

Step 1 through step 9 are used to manufacture detectors optimized for UV radiation or detectors optimized for EUV radiation. These process steps are conventional techniques used in integrated circuit manufacturing.

Step 10 grows a radiation hard oxide layer. Approximately 7 nm will be grown for EUV detectors and 70 nm will be grown for UV detectors. UV radiation will not be significantly absorbed in the 70 nm passivating layer.

Step 11 through step 16 are used to manufacture both UV and EUV detectors. These process steps are conventional techniques used in integrated circuit manufacturing. Steps 12 and 16 are tests that verify if the desired electrical characteristics have been achieved.

Step 17 is an optional step used only for manufacturing photodiodes optimized for EUV radiation. A thin metal film such as tin is deposited on the detector to provide a means of protecting the 7 nm $SiO_2$ passivating layer as well as the n-type region from being damaged when etching the microporous filter in step 20. The thick oxide used when manufacturing the UV detector will provide adequate protection from the etching process thus this step will be eliminated when making UV detectors.

Step 18 is the deposition of a thick metal film such as aluminum that will be masked and etched to form the microporous filter.

Step 19 is the masking process which will define the hole size and pattern for the microporous filter.

Step 20 is a plasma etch process used to form the holes in the microporous filter.

Step 21 through step 23 are used to manufacture detectors optimized for both UV or EUV radiation. These process steps are conventional techniques used in integrated circuit manufacturing.

Figure 4:
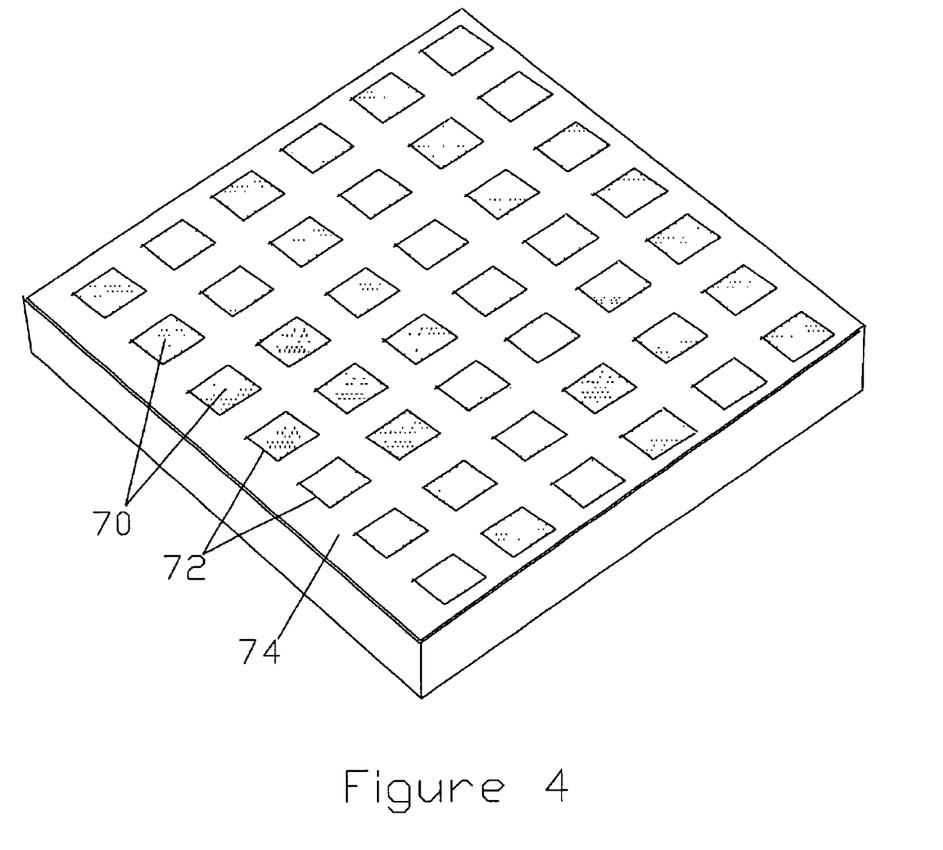
FIG. 4 illustrates a third embodiment of the present invention.

FIG. 4 illustrates another embodiment of the invention. A microporous filter 70 is formed over a photodiode array consisting of multiple active pixel sensors 72 formed on a semiconductor substrate 74. The process for forming the microporous filter over the photodiode array will be similar as the method described above for a single photodiode. This type of device will be appropriately used for imaging applications in which CCD type arrays will not provide adequate performance in optically noisy environments. FIG. 4 shows a simplified view of the photodiode array with integrated microporous filters for conceptual understanding only.

Operation

The hole diameter, thickness of the filter and the number of holes per filter unit area will determine the spectral transmittance of the filter. In one embodiment of the invention, the holes are uniformly spaced and in another embodiment, the holes are randomly spaced. Further testing will be needed to determine how hole arrangement will govern the performance of these detectors. By utilizing 13 nm and 157 nm microlithography, hole diameters of 40 nm and 100 nm will be attainable. These technologies are currently being developed and will be readily available within the next few years.

Figure 5:
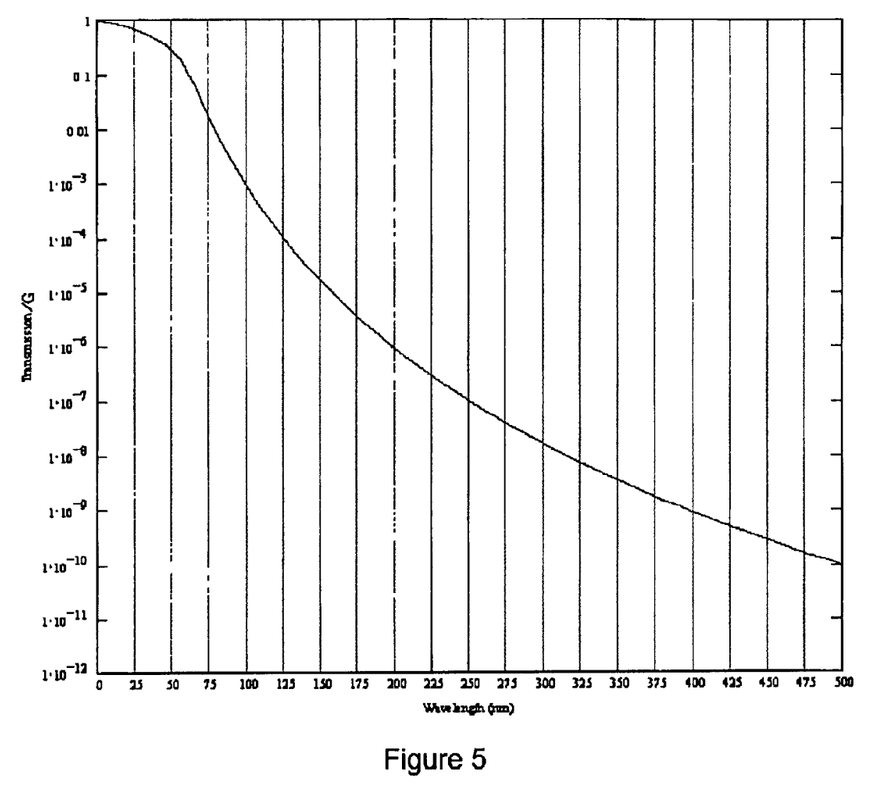
FIG. 5 is a graph which illustrates the spectral transmission with respect to wavelength for one embodiment of the photodiode with an integrated microporous filter.

FIG. 5 shows the spectral transmission $T_f$ of a microporous filter as a function of wavelength $\lambda$ for one embodiment of the microporous filter. In this embodiment, $D_0$ is 0.3 micron, L is 1 micron, and $N_p$ is 2000 holes/cm$^2$ with the holes being randomly spaced. As seen from the graph, the transmission for wavelengths shorter than 75 nm is $10^8$ times more than the transmission for wavelengths longer than 500 nm. By varying $D_0$, $N_p$ and L, it is possible to tune the filter to pass a given band of wavelengths.

Figure 6:
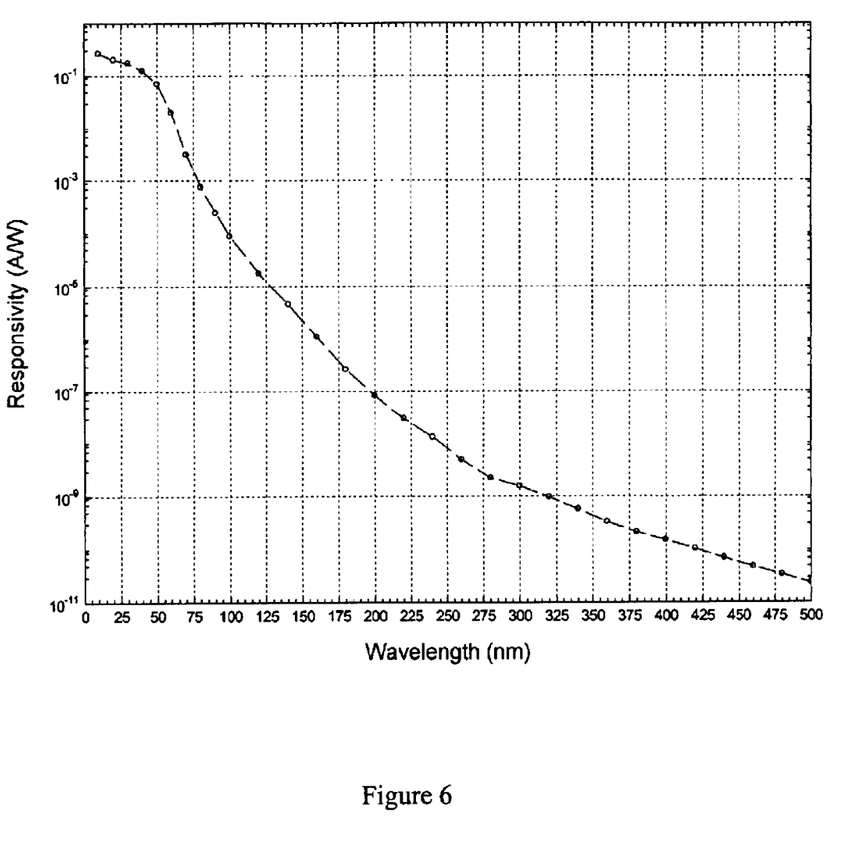
FIG. 6 is a graph which illustrates the spectral responsivity of the photodiode with integrated microporous filter according to an embodiment of the present invention.

The spectral responsivity describes how a detector converts a given amount of incident radiation into current which is measured in an external circuit. FIG. 6 shows the estimated spectral responsivity of one embodiment of the photodiode with microporous filter. The spectral responsivity of this device is derived from the typical responsivity of an EUV photodiode fabricated as described in FIG. 3 without microporous filter, multiplied by the spectral transmission of one embodiment of the microporous filter shown in FIG. 5.

Summary

A variety of modifications of the present invention will be obvious to those of ordinary skill in photodetector design and fabrication. The microporous filter could be formed on photodetectors made from many different types of semiconductor materials including Si, GaN or SiC. The microporous filter could also be formed over CCD type arrays, active pixel sensor arrays, self scanning arrays and passive multi-element photodiode arrays. Hole sizes and patterns may be varied. Many different metals, alloys or synthetic materials can be used to form the microporous filter. Different processing techniques to form the microporous filter may be developed to achieve similar or better results as those presented here.

It should now be apparent that a photodiode with integrated metallic microporous filter is provided and a process for manufacturing the invention is presented. This device will provide a means of making UV/EUV measurements in optically noisy environments by providing in excess of six orders of magnitude visible light blocking. The device can also be used to detect electrons, ions and other particles in the presence of optical radiation.

The manufacturing process presented consists of techniques that are known in the semiconductor industry. The technology to manufacture 200 nm diameter holes is available at this time and the technology to make 40 nm diameter holes will be available in the near future. The microporous filter may be formed on many types of semiconductor photodiodes and photodiode arrays.

We claim:

1. An integrated photodiode-filter system comprising:
    a semiconductor substrate, a photodiode comprised of an active surface formed in and on said semiconductor substrate; and
    an integrated microporous filter formed on said active surface, wherein said microporous filter comprises a thin film and said microporous filter contains a plurality of holes that pass from the top of said film, through said film, to said active surface.

2. The integrated photodiode-filter system of claim 1, wherein said thin film is formed from a material selected from the group of materials consisting of metals and metal oxides.

3. The integrated photodiode-filter system of claim 1, wherein said thin film is aluminum.

4. The integrated photodiode-filter system of claim 1, wherein said film is aluminum and aluminum-oxide.

5. The integrated photodiode-filter system of claim 1, wherein said holes have diameters ranging from 1 nm to 1 um.

6. The integrated photodiode-filter system of claim 1, wherein said holes are spaced uniformly.

7. The integrated photodiode-filter system of claim 1, wherein said holes are spaced randomly.

8. A method of producing an integrated photodiode-filter system comprising:
    providing a semiconductor substrate;
    forming a photodiode comprised of an active surface formed in and on said semiconductor substrate using techniques of photolithography; and
    forming an integrated microporous filter over said active surface, wherein said microporous filter comprises a thin film and said microporous filter contains a plurality of holes that pass from the top of said film, through said film, to said active surface.

9. A method as defined in claim 8, wherein said holes in said microporous filter are formed by lithography and etching.

10. A method as defined in claim 8, wherein said holes in said microporous filter are formed by anodic oxidation.

11. An integrated photodiode array-filter system comprising:
    a semiconductor substrate, a photodiode array comprised of a matrix of active surfaces formed in and on said semiconductor substrate; and
    a matrix of integrated microporous filters formed on said matrix of active surfaces, wherein each individual microporous filter of said matrix of microporous filters comprises a thin film and said individual microporous filter contains a plurality of holes that pass from the top of said film, through said film, to an active surface of said matrix of active surfaces.

* * * * *